Nov. 1, 1960  K. H. WILCOXON  2,958,488
QUIET STRUT FOR NOISE MEASUREMENTS
Filed May 8, 1958  3 Sheets-Sheet 1
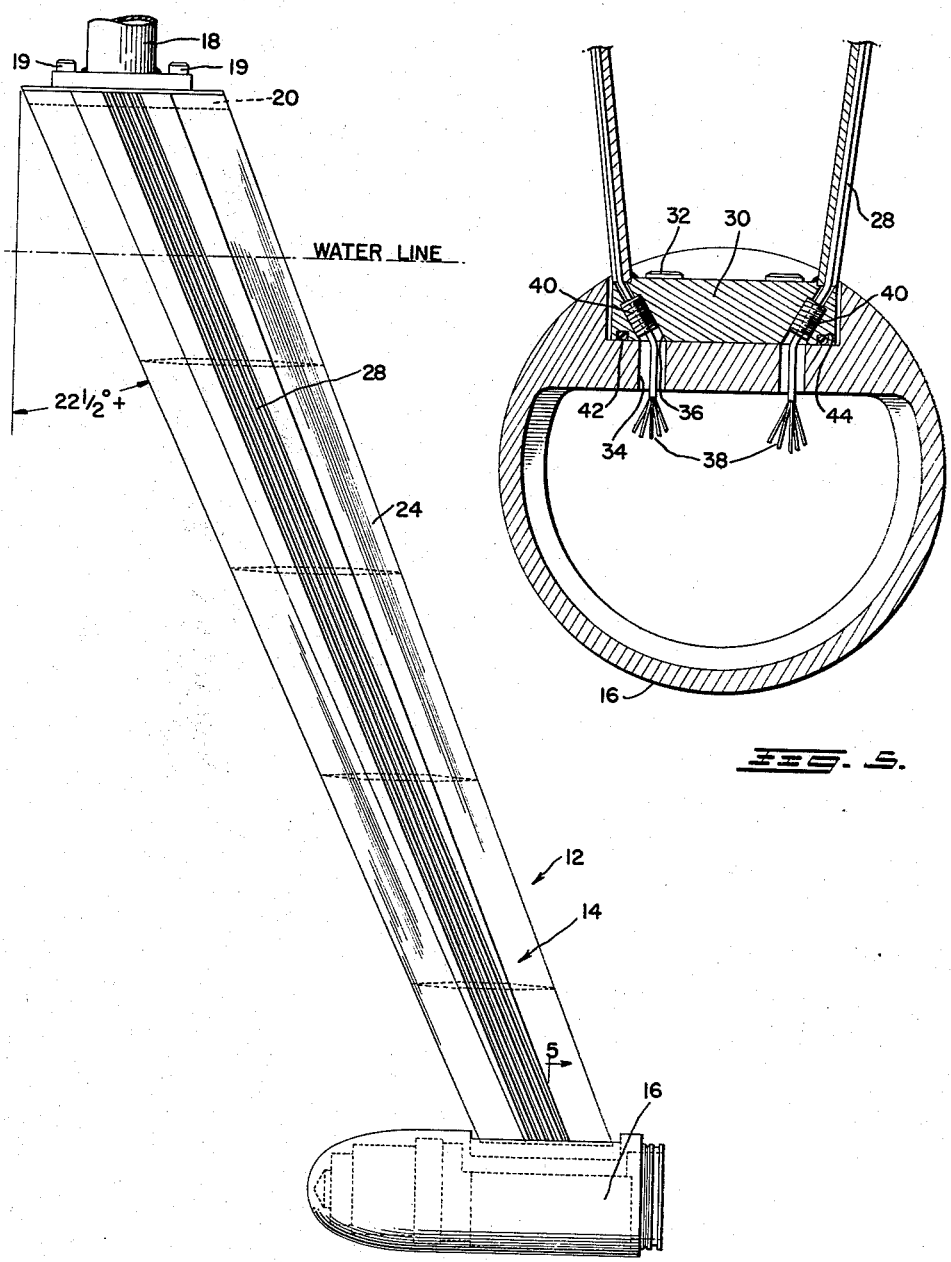
INVENTOR
KENNETH H. WILCOXON
BY
B. L. Zangwill
ATTORNEY

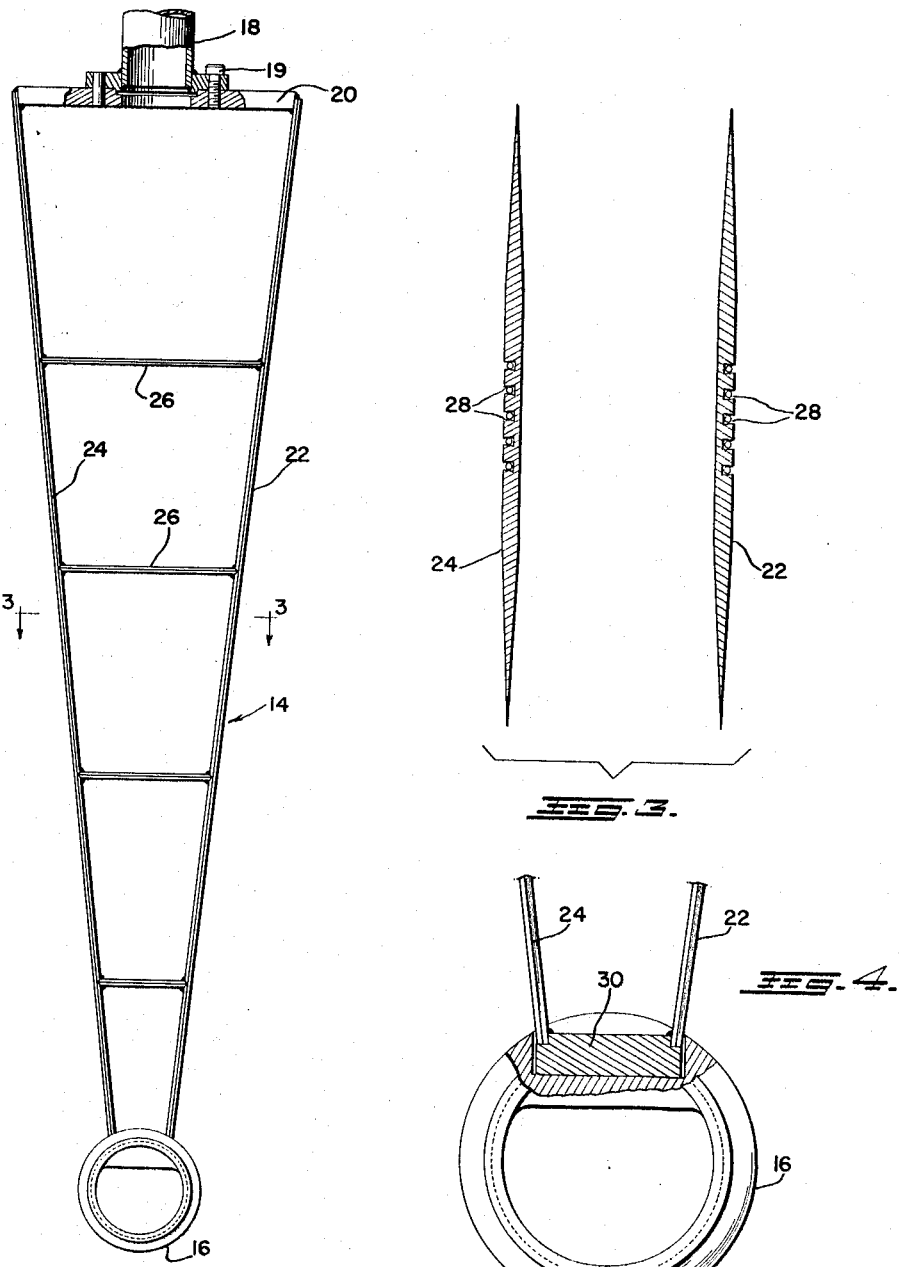

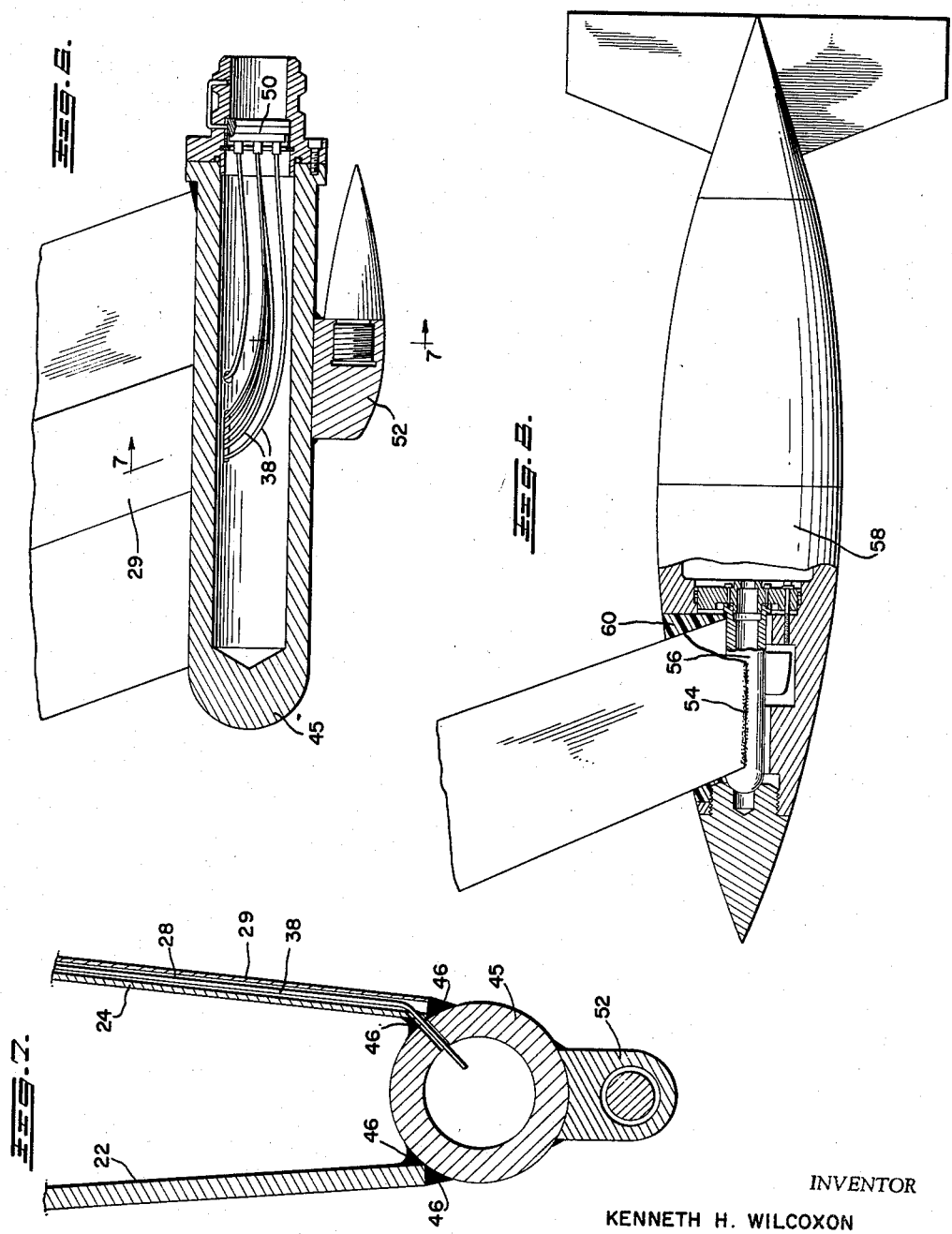

2,958,488
QUIET STRUT FOR NOISE MEASUREMENTS

Kenneth H. Wilcoxon, Cabin John, Md., assignor to the United States of America as represented by the Secretary of the Navy Filed May 8, 1958, Ser. No. 734,060

8 Claims. (Cl. 248—1)

(Granted under Title 35, U.S. Code (1952), sec. 266)

The invention described herein may be manufactured and used by or for the Government of the United States of America for governmental purposes without the payment of any royalties thereon or therefor.

This invention relates to a towing strut for a hydrophone, and more particularly to a strut adapted to be towed through water at relatively high speeds without producing excessive noise.

This inveniton relates to a means for continuously measuring the noise level of an object as it is being towed through water. In accordance with the prior art techniques, whenever it is necessary to make a noise measurement of an object such as a torpedo for example as it is towed through water on a test carriage, it has been the practice to place a hydrophone in a stationary position in the path of the moving object and move said object past the hydrophone a number of times. Thus with the prior art method described above, a hydrophone is placed in proximity to the towed device and a noise measurement is possible only when the towed device is moved past the hydrophone, thereby making it necessary to run the device past the hydrophone a number of times in order to get a proper series of noise measurements. It is pointed out that the prior art practice requires that the carriage be reversed, run back past the hydrophone and then run forwardly past the same hydrophone for each test run, which obviously requires a great deal of time and effort, half of said time being consumed in returning the carriage, and device under test to its home position.

All previous attempts at towing the hydrophone on the test carriage along with the device under test have met with failure, largely due to the fact that the hydrophone supporting member creates considerable turbulence in the water at the point where it enters the same. Most struts throw up a considerable amount of wake and cause splashing of the water, which in turn creates a great deal of noise that is picked up by the hydrophone, thereby making it difficult to distinguish the noise that the towing member makes from that of the device under test.

It is an object of this invention to overcome the disadvantages of the prior art as described above.

Another object of this invention is to make possible the taking of continuous underwater sound measurements of a moving object.

A further object of this invention is to provide a means to reduce the self-noise of towed hydrophones.

Still another object of this invention is to reduce splashing noise produced by a hydrophone supporting strut as said strut is moved through the water.

In accordance with the instant invention a particular type of towing strut is provided especially for a towable hydrophone. Specifically, the strut consists of a pair of spaced, downwardly convergent strut legs each of which is fixedly attached at its upper end to a bracket plate adapted to be situated in a horizontal plane as the strut is towed through the water. Each of the strut legs is attached to the supporting bracket in such a manner that when the device is being towed through the water with said supporting bracket in a horizontal plane, both of said legs are inclined rearwardly of a vertical line extending perpendicularly to said supporting bracket whereby the overall strut inclination is rearward of the direction of movement of said strut. Also, for reasons hereinafter made clear, each of the strut legs is provided with knife-like leading and trailing edges and each of said legs is made considerably wider than it is thick.

Other objects and many of the attendant advantages of this invention will be readily appreciated as the same becomes better understood by reference to the following detailed description when considered in connection with the accompanying drawings wherein:

Fig. 1 is a side view of a preferred embodiment of the invention;

Fig. 2 is a rear view of the embodiment shown in Fig. 1;

Fig. 3 is a sectional view of the invention taken on line 3—3 of Fig. 2;

Fig. 4 is an enlarged rear view, partially broken away and partially in section, of the embodiment of the invention shown in Fig. 1;

Fig. 5 is a sectional view of the invention, taken on line 5—5 of Fig. 1;

Fig. 6 is a side view, partially broken away and in section, of another embodiment of the invention;

Fig. 7 is a front sectional view taken on line 7—7 of Fig. 6; and

Fig. 8 is a side view, partially broken away and in section, of still another embodiment of the invention.

Referring now to the drawings wherein like reference characters designate either like or corresponding parts throughout the several views, there is shown in Fig. 1 a side view of the instant hydrophone and strut combination 12. The combination 12 comprises a strut 14 having a hydrophone housing 16, either bolted or otherwise rigidly affixed to the lower end thereof. A bracket 18 is fixedly attached to the upper end of the strut 14 by conventional means such as bolts 19, that are threaded into a plate 20 that is fixed to the strut 14 by welding or the like. The bracket 18 is adapted to be attached to a towing carriage or the like, whereby the strut-hydrophone housing combination 12 may be towed through water.

The strut 14 comprises starboard and port strut legs 22 and 24 respectively. The strut legs 22 and 24 are arranged in fixed, spaced relation to one another and are held in said fixed position by a series of bracing members 26 extending therebetween; said bracing members 26 having their opposite ends fixedly attached to their respective strut legs 22 and 24 by a welded joint.

As can be seen in Fig. 3 the strut legs 22 and 24 are parallel to one another in a direction transverse of the strut, and are downwardly convergent in a direction running lengthwise of the strut 14. Each of the strut legs 22 and 24 is provided with a series of grooves 28 for a purpose hereinafter explained. If desired, a plate 29 may be detachably affixed to each of the strut legs in such a manner as to cover the grooves 28 in the manner shown in Figs. 6 and 7.

In accordance with the preferred embodiment of the invention, as illustrated in Figs. 1–5, each of the strut legs 22 and 24 is rigidly affixed at its lower end, by welding or the like, to a plate 30. The upper extremities of the respective strut legs 22 and 24 are attached by welding to the bracket plate 20 that has, in turn, attached thereto the strut supporting member 18 adapted for attachment to a towing carriage or the like. The strut legs are attached to the bracket plate 20 at such an angle that when the strut is towed through the water its leading edges are at an angle of no less than 22½ degrees with the vertical, and preferably 25° for reasons hereinafter given.

As will be noted upon examination of Fig. 1, the strut 14 is so attached to the bracket plate 20 that it is inclined rearwardly from the direction of movement of the strut, the direction of movement as viewed in Fig. 1, being right to left. Under normal towing conditions the bracket plate 20 is maintained in a substantially horizontal position. Due to the rearward slope of the strut 14, said strut tends to remain in a line with the direction of movement thereof, instead of either twisting or vibrating about the support member 18, this tendency for self-alignment being analogous to the tendency of a caster of the type found on items of furniture to remain aligned with the direction of movement of the furniture.

By virtue of the self-aligning and vibration free nature of the instant strut 14 due to its rearward inclination, it is possible to make the strut legs 22 and 24 much thinner than they would be if said strut were perfectly vertical as it is towed through the water. If the strut were vertical it would be necessary to make the strut legs 22 and 24, and the brace members 26 considerably thicker in order to prevent twisting and/or vibration of said strut, which would in turn raise other problems, the most objectionable of which would be that the thicker strut legs would cause the strut to throw up considerably more wake at the leading edges thereof which would in turn create more self-noise, thereby making noise measurements more difficult, if not impossible.

The angle at which the leading edge of each of the strut legs enters the water has been found, by experimentation, to be of considerable importance. First it has been noted that when the leading edge of the respective strut legs makes an angle of less than 22½° with the vertical, the strut 14 becomes unstable and tends to shake and/or vibrate. Also, if the strut makes an angle of less than 22½° with the vertical the wake created by the movement of the strut through the water creates so much wake, and thus noise, as to make noise measurements of the device under test substantially impossible; the noise created by the wake is at such a high level as to drown out the noise created by the torpedo or other device under examination. It has been found that where a strut structure of the type described above is used it is possible to maintain test speeds of as high as 20 knots and yet create a wake of less than 2″. At speeds of 10 knots or less, the strut moves through the water without breaking the surface tension and therefore creates little or no wake.

It is pointed out that each strut leg is provided with a knife-like leading edge and trailing edge, and that each leg is considerably wider than it is thick, for example, a desirable, but by no means the only width to thickness ratio is one of 40:1. In connection with this dimensional relationship it has been found desirable to have a sharp edge at both the leading edge of the strut leg and the trailing edge thereof. The sharp edge at the front of the strut leg cuts down on water disturbance such as splashing and the like, while the sharp edge at the trailing edge of the strut tends to eliminate the phenomenon known as "singing" which sound may be picked up by the hydrophone and thereby cause erroneous readings.

In accordance with the preferred embodiment of the invention, shown in Figs. 1–5, the plate 30 at the lower end of the strut 14 is provided with a plurality of holes, not shown, extending therethrough and adapted to receive a plurality of connecting bolts 32 adapted to be threaded into tapped and threaded holes provided in the hydrophone housing 16, whereby the strut 14 is bolted to said housing 16 in the manner shown in Fig. 5. The hydrophone housing 16 is provided with a suitable number of holes 34 extending therethrough and communicating with like holes 36 in the plate 30, said holes being adapted to receive the electrical wires 38 from the hydrophone mechanism. The wires 38 extend through the holes in the hydrophone housing and the connecting plate respectively, up through the grooves 28 in each of the strut legs and thence to suitable recording equipment on the towing medium. Each of the holes 36 in the connecting plate 30 is provided with a sealing gland 40 through which the wires 38 extend, said glands preventing entry of water into the hydrophone housing 16 through the holes 34 and 36. A watertight seal between the plate 30 and the hydrophone housing 16 is insured by the use of suitable packing gaskets or glands 42 provided in grooves 44 formed in the lower face of said connecting plate 30.

Attention is directed to Figs. 6 and 7 wherein are shown a modification of the invention. In this modification the same strut legs 22 and 24 are utilized, but a hydrophone supporting member 45 is attached to said legs in a different manner than that shown in Figs. 1–5, namely by being welded to said hydrophone housing, as at 46. Further, the strut legs 22 and 24 are provided with a cover plate 29 over the grooves 26. In accordance with the modifications shown in Figs. 6 and 7, electric lines 38 extend from the recording apparatus (not shown) on the towing carriage or the like, down through the grooves 28 in at least one of the strut legs, into the member 45 at the lower end of the strut legs and terminate at a connector member 50 at the trailing end of said member 45. On the lower face of the member 45 there is fixedly mounted a connecting block 52 to which is adapted to be attached a towing cable (not shown) connected to a hydrophone, whereby tension on the hydrophone is taken up by said towing cable, rather than by the electrical connection 50. The electrical leads from the hydrophone terminate in a connector of conventional form (not shown) adapted to be attached to the member 45 at its trailing end, in mating relation with the connector 50, whereby contact is maintained with the leads 38 extending through said member 45 and up through the grooves formed in the strut leg. Thus the embodiment shown in Figs. 6 and 7 is adapted to tow a hydrophone at some distance behind the strut legs.

Fig. 8 shows a further embodiment of the invention wherein another method is provided for attaching a hydrophone housing to the generic strut legs 22 and 24. As shown in Fig. 8, the respective strut legs 22 and 24 are attached by welding or the like 54 to a tubular member 56 that is in turn attached to a hydrophone housing 58. The hydrophone housing 58 is attached either by bolts, or by other suitable means, to the tubular member 56. A rubber bushing 60 surrounds the strut legs at the point where they enter the hydrophone carrier.

It is emphasized that while Figs. 6, 7 and 8 illustrate different manners of attaching a hydrophone to the applicant's strut, the essence of the applicant's invention lies in the particular strut arrangement and more particularly the fact that the strut legs 22 and 24 are of extremely thin construction and are adapted to enter the water at such an angle as to minimize the noise created by the strut legs themselves. It is pointed out that the applicant's strut 14 is readily adapted for attachment to the various types of hydrophone housings, and that the invention is not limited to the manner of attachment shown. Specifically, the invention resides in the particular strut configuration shown, with its angulation relative to the vertical, and the combination therewith of a hydrophone housing rigidly attached to the low end thereof.

Obviously many modifications and variations of the present invention are possible in the light of the above teachings. It is therefore to be understood that within the scope of the appended claims the invention may be practiced otherwise than as specifically described.

What is claimed is:

1. A towing strut for a towable housing, said strut comprising a pair of strut legs arranged in side-by-side relation, each of said strut legs having a leading edge and a trailing edge, both of said edges being rearwardly inclined whereby resistance to lateral vibrations is imparted to said strut legs when they are towed through water, means holding said legs fixed relative to one another, means at one end of said strut for supporting a towable housing, and a connecting means at the opposite end of said strut for attaching said strut to a towing mechanism.

2. A towing strut as set forth in claim 1 wherein the leading edge of each of said legs is knife-like in form.

3. A towing strut as set forth in claim 1 wherein each of said leading edges is rearwardly inclined at an angle of at least 22½°.

4. A towing strut as set forth in claim 3 wherein each leg has a width to thickness ratio in the order of 40:1.

5. A towing strut as set forth in claim 4 wherein the leading edge of each of said legs has a sharp vertical edge.

6. The combination of a towing strut and a hydrophone housing attached thereto, said strut comprising a pair of strut legs arranged in side-by-side relation, each of said strut legs having a leading edge and a trailing edge, both of said legs being rearwardly inclined whereby resistance to lateral vibrations is imparted to said strut legs when they are towed through water, means holding said legs fixed relative to one another, supporting means at the lower end of said strut for supporting said hydrophone housing, means at the opposite end of said strut for attaching said strut to a towing mechanism, and each of said legs having a plurality of elongated slots formed therein and extending longitudinally thereof for reception of electrical leads from said hydrophone housing, and a cover plate for said slots.

7. The combination as set forth in claim 6 wherein the leading edge of each of said legs is knife-like in form and has a width to thickness ratio of at least 40 to 1.

8. The combination as set forth in claim 6 wherein each of said leading edges is rearwardly inclined at an angle of at least 22½°.

References Cited in the file of this patent

UNITED STATES PATENTS

| | | |
|---|---|---|
| 1,400,211 | Burney | Dec. 13, 1921 |
| 1,886,072 | Williams | Nov. 1, 1932 |
| 2,646,950 | Nelson | July 28, 1953 |

FOREIGN PATENTS

| | | |
|---|---|---|
| 17,456 | Great Britain | 1909 |
| 993,187 | France | July 18, 1951 |